(12) United States Patent
Johnson, II et al.

(10) Patent No.: US 11,845,072 B2
(45) Date of Patent: Dec. 19, 2023

(54) PROCESS AND APPARATUS FOR INDIRECT CATALYST HEATING

(71) Applicant: UOP LLC, Des Plaines, IL (US)

(72) Inventors: Richard A. Johnson, II, Algonquin, IL (US); John Senetar, Naperville, IL (US)

(73) Assignee: UOP LLC, Des Plaines, IL (US)

( * ) Notice: Subject to any disclaimer, the term of this patent is extended or adjusted under 35 U.S.C. 154(b) by 416 days.

(21) Appl. No.: 17/306,070

(22) Filed: May 3, 2021

(65) Prior Publication Data
US 2022/0347670 A1 Nov. 3, 2022

(51) Int. Cl.
*B01J 38/32* (2006.01)
*B01J 8/18* (2006.01)
*B01J 8/24* (2006.01)
*B01J 8/00* (2006.01)

(52) U.S. Cl.
CPC ............... *B01J 38/32* (2013.01); *B01J 8/004* (2013.01); *B01J 8/1836* (2013.01); *B01J 8/24* (2013.01); *B01J 2208/00132* (2013.01); *B01J 2208/00176* (2013.01); *B01J 2208/00194* (2013.01); *B01J 2208/00504* (2013.01)

(58) Field of Classification Search
CPC . B01J 38/32; B01J 8/1836; B01J 2208/00132
See application file for complete search history.

(56) References Cited

U.S. PATENT DOCUMENTS

| | | |
|---|---|---|
| 5,066,627 A | 11/1991 | Owen et al. |
| 8,293,670 B2 | 10/2012 | Myers et al. |
| 8,624,074 B2 | 1/2014 | Towler et al. |
| 2016/0167005 A1 | 6/2016 | Sandacz et al. |
| 2016/0168049 A1 | 6/2016 | Sandacz et al. |
| 2016/0168050 A1 | 6/2016 | Fei et al. |
| 2017/0198221 A1 | 7/2017 | Targett et al. |
| 2018/0178208 A1 | 6/2018 | Davydov |
| 2021/0047573 A1 | 2/2021 | Bourane et al. |

OTHER PUBLICATIONS

"Search Report and Written Opinion" dated Aug. 17, 2022.

*Primary Examiner* — Catherine S Branch
(74) *Attorney, Agent, or Firm* — Paschall & Associates, LLC; James C. Paschall

(57) ABSTRACT

A process and apparatus for indirect heating of catalyst in the regeneration zone is disclosed. A hot flue gas flows within a heating tube and the catalyst to be heated flows outside the heating tube. The hot flue gas is generated by igniting a fuel stream. The hot flue gas is generated directly in the heating tube or is generated in a separate burner outside the heating tube.

9 Claims, 4 Drawing Sheets

PROCESS AND APPARATUS FOR INDIRECT CATALYST HEATING

FIELD

The present disclosure relates to catalytic conversion processes and in particular, the disclosure is directed to dehydrogenation conversion processes for the production of olefins.

BACKGROUND

Fluidized catalytic reactions are conducted at elevated temperatures with fluidized catalyst that is free to move out of the reactor. Fluidized catalytic processes include fluid catalytic cracking (FCC) and paraffin dehydrogenation (PDH).

The production of light olefins, ethylene and propylene, are used in the production of polyethylene and polypropylene, which are among the most commonly manufactured plastics today. Currently, the majority of light olefins production comes from steam cracking and FCC. However, the demand for light olefins is still growing and other means of increasing the production of light olefins have been sought.

PDH is a process in which light paraffins such as ethane and propane can be dehydrogenated to make ethylene and propylene, respectively. Dehydrogenation is an endothermic reaction which requires external heat to drive the reaction to completion. In PDH, heavy hydrocarbon byproducts are produced that must be separated from the light olefin products. Fluid catalytic cracking (FCC) is another endothermic process which produces ethylene and propylene.

In PDH and FCC reactions with fluidized catalyst, coke can deposit on the catalyst while catalyzing the reaction. The catalyst may be regenerated in a catalyst regenerator by combusting coke from the catalyst in the presence of oxygen. The hot regenerated catalyst may then be transferred back to the reactor to catalyze the reaction.

Refiners have developed a process to circulate hot catalyst from the regenerator to the reactor so as to heat the incoming feed and to supply the endothermic heat of reaction. One way to supply the necessary heat requirements to the catalyst is to use the heat of combustion of byproduct coke. However, in recent processes, the coke yield is relatively low, and the combustion of coke is expected to be insufficient to supply the entire heat requirement.

Another approach is to burn the fuel directly in the catalyst bed of the regenerator. However, incomplete combustion of fuel and contact of catalyst with contaminated fuel gas accompany this approach. Moreover, this approach risks exposing the catalyst to intense heat which can damage the catalyst due to direct contact with the flame.

Improved processes for heating the catalyst particularly for endothermic reactions is required.

SUMMARY

We have found an improved process and apparatus for indirectly heating a catalyst stream before passing it to a dehydrogenation reactor. A hot flue gas is generated by igniting a fuel stream. A hot flue gas flows within a heating tube to heat the catalyst stream flowing outside the heating tube. The hot flue gas is generated either directly in the heating tube or is generated in a separate burner outside the regeneration vessel. Indirect heating can be performed using the catalyst heater present outside the regeneration vessel or in tube fired burners arranged in the regeneration vessel.

Definitions

These and other features, aspects, and advantages of the present disclosure are further explained by the following detailed description, drawings and appended claims.

As used herein, the term "stream" can include various hydrocarbon molecules, such as straight-chain, branched, or cyclic alkanes, alkenes, alkadienes, and alkynes, and optionally other substances, such as gases, e.g., hydrogen, oxygen, or impurities, such as metals, and sulfur and nitrogen compounds. The stream can also include aromatic and non-aromatic hydrocarbons. Moreover, the hydrocarbon molecules may be abbreviated C1, C2, C3 ... Cn where "n" represents the number of carbon atoms in the one or more hydrocarbon molecules. Furthermore, a superscript "+" or "−" may be used with an abbreviated one or more hydrocarbons notation, e.g., C3+ or C3−, which is inclusive of the abbreviated one or more hydrocarbons. As an example, the abbreviation "C3+" means one or more hydrocarbon molecules of three and/or more carbon atoms.

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "convective heat transfer" can refer to the transfer of thermal energy through the movement of a liquid or gas.

As used herein, the term "radiant heating" can refer to the transfer of heat through thermal emission.

Figure 1:
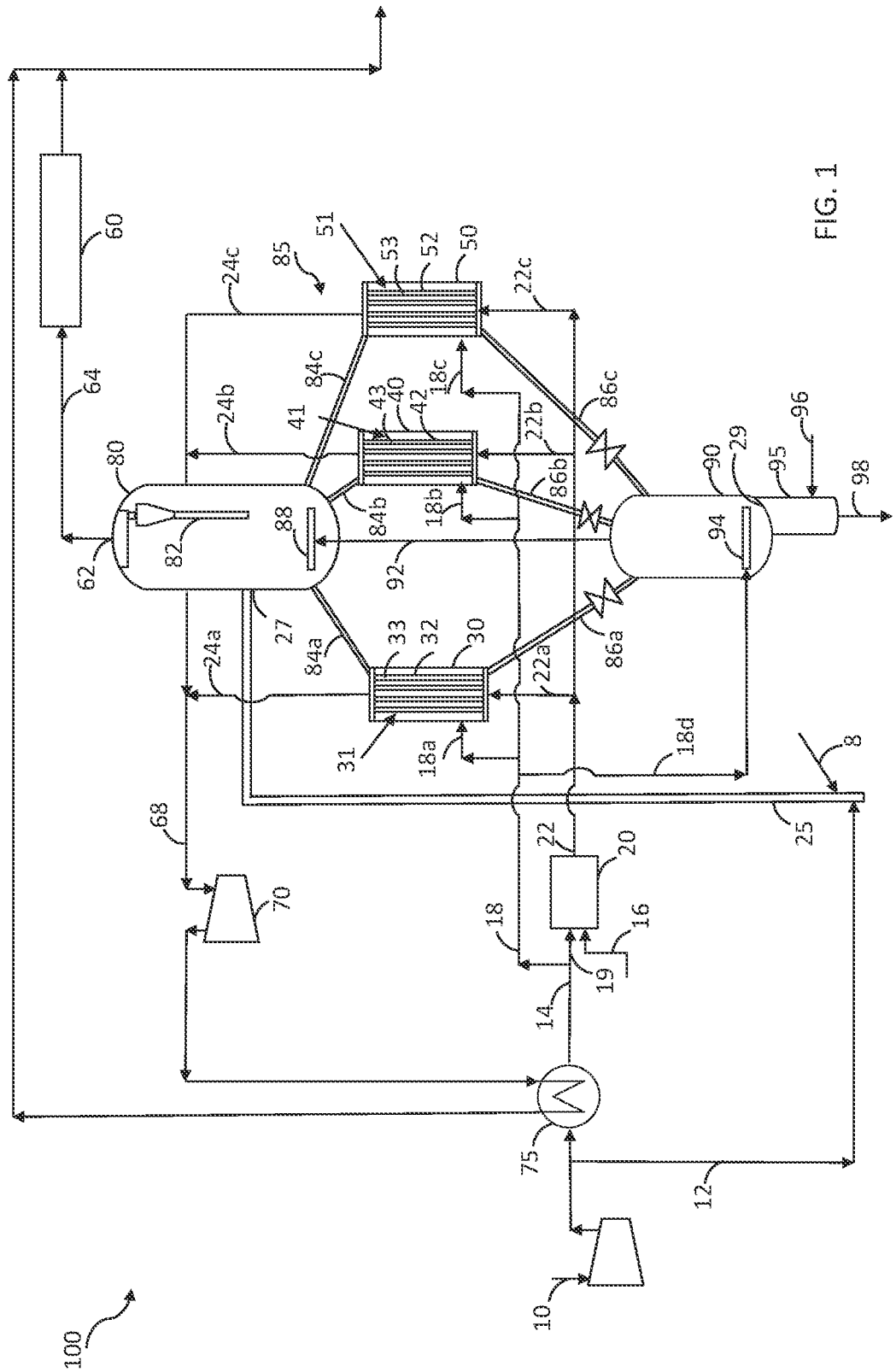
FIG. 1 is a schematic representation of a regeneration zone with three catalyst heaters arrange outside a regeneration vessel.

Skilled artisans will appreciate that elements in the drawings are illustrated for simplicity and clarity and have not necessarily been drawn to scale. For example, the dimensions of some of the elements in the drawings may be exaggerated relative to other elements to help improve understanding of various embodiments of the present disclosure. Also, common but well-understood elements that are useful or necessary in a commercially feasible embodiment may not be depicted in order to facilitate a less obstructed view of these various embodiments of the present disclosure.

DETAILED DESCRIPTION

The process and apparatus described herein are particularly useful for indirectly heating a catalyst stream in a regeneration zone before passing it to a reactor. Combustion generated by igniting a fuel stream is used to heat the catalyst stream. Combustion is conducted either directly in the heating tube or in a separate burner upstream of the heating tube. In the former case, combustion heat generated inside the tube heats the catalyst flowing outside and contacting the heating tube. In the latter case, the hot flue gas flows within a heating tube to heat the catalyst stream flowing outside of the heating tube. Indirect heating can be achieved using a catalyst heater located outside the regeneration vessel or in tube fired burners with tubes located inside the regeneration vessel.

Conventional direct heating approaches have many challenges such as: 1) exposure of catalyst to flue gas containing large amounts of contaminants such as water and carbon dioxide, 2) development of a hot zone which can thermally damage the catalyst, 3) incomplete combustion of fuel with oxygen due to interference by solid catalyst particles. Overall, aspects of the disclosure are associated with a process and apparatus for indirect heating of catalyst in the regeneration zone before passing the catalyst stream to a reactor to provide the necessary heat required for the process.

In an embodiment, a hot flue gas flows within a heating tube and the catalyst stream to be heated flows outside in proximity to and contacts the heating tube. Since, the heat exchange is indirect with the hot flue gas, there will be no requirement to treat the hot flue gas for fines removal. Further, the catalyst can be heated up to a desired target temperature without any risk of generating hot zones in the catalyst bed. Also, because the combustion is not taking place in the catalyst bed, the chance of incomplete combustion of fuel is reduced.

Conversion processes such as PDH and FCC can be carried out through a fluidized bed system. However, due to the highly endothermic nature of these reactions, a substantial amount of heat is needed to be added to the reaction to maintain the reaction at a temperature sufficient for the reaction to proceed at a satisfactory rate. Heat necessary for the reaction may be supplied by heating and circulating hot regenerated catalyst in the process. However, if insufficient coke is available on the catalyst to be combusted, additional means for heating the catalyst is necessary. A process and apparatus for heating the catalyst stream before passing it to the conversion reactor have been developed. This approach for generating a heated regenerated catalyst stream to provide the endothermic heat of reaction can be applied to other processes including but not limited to FCC, catalytic reforming, and dehydrogenation of alkyl aromatics.

An example of a regeneration zone 100 that heats catalyst by indirect heat exchange with flue gas is shown in FIG. 1 which includes a regeneration vessel 85 having an upper chamber 80 and a lower chamber 90, a riser 25, a plurality of catalyst heaters 30, 40, 50, a burner 20, and a catalyst stripping vessel 95.

FIG. 1 depicts the regenerator vessel 85 comprising the upper chamber 80 and the lower chamber 90. The regeneration vessel 85 comprises of a regenerator catalyst inlet 27 and a regenerator catalyst outlet 29. However, other types of regenerator vessels are also suitable. A spent catalyst stream in a spent catalyst line 8 perhaps coming from a reactor (not shown in the drawing) is sent to the upper chamber 80 via the riser 25. The reactor may be a PDH reactor, a FCC reactor, a reforming reactor or another reactor. The reactor may comprise a reactor catalyst inlet and a reactor catalyst outlet through which the spent catalyst exists the reactor. The regeneration vessel 85 may be in downstream communication with the reactor via the reactor catalyst outlet. An oxygen containing gas, such as air, in a lift gas line 12 may be used as a catalyst lift gas in the riser 25. A regeneration gas stream comprising oxygen in a regeneration gas line 92 from the lower chamber 90 is introduced into the upper chamber 80 through a gas distributor 88 to contact the spent catalyst stream from line 8 in the upper chamber 80. The oxygen in the regeneration gas stream 92 combusts coke deposited on the catalyst and provides a partially regenerated catalyst and flue gas.

Separation of the partially regenerated catalyst from regeneration flue gas is achieved using a cyclone separator 82 within the upper chamber 80 of the regeneration vessel. The partially regenerated catalyst separated from regeneration flue gas dispenses through a dip leg from the cyclone separator 82 while regeneration flue gas relatively lighter than catalyst sequentially exits the cyclone separator 82 and is discharged from the regenerator vessel through a flue gas outlet 62 in a flue gas line 64. The regeneration flue gas is directed to the atmosphere after it passes through a catalyst and heat recovery unit 60.

The partially regenerated catalyst stream exits the upper chamber 80 through one or more partially regenerated catalyst lines 84a, 84b, 84c and is passed to the catalyst heaters 30, 40 and 50, respectively, for heating. The plurality of catalyst heaters 30, 40 and 50 may be arranged outside of the regeneration vessel.

As shown in FIG. 1 an oxygen containing gas stream, such as air, in an oxygen line 10 is passed to the burner 20. A fuel stream in a fuel line 16 is also passed to the burner 20. The oxygen containing gas stream 10 may be compressed in a compressor and preheated in a pre-heater 75 to provide a pre-heated and compressed oxygen containing gas stream in a line 14. A portion of the compressed oxygen containing gas stream may be taken in the lift gas line 12 to be used as lift gas in the riser 25 before it is heated. A working stream in line 18 may be taken from the pre-heated and compressed oxygen containing gas stream in line 14, A portion of the pre-heated and compressed oxygen containing gas stream taken from line 14 is passed to the burner 20 in line 19 as a combustion stream. A working stream in a line 18 is taken out and divided into fluidization streams in lines 18a, 18b, and 18c, Fluidization streams in lines 18a-18c are used for catalyst fluidization in the catalyst heaters 30, 40 and 50. Another portion of working stream in a line 18d may be passed as a combustion and fluidization stream to the lower chamber 90 through a distributor 94.

The combustion and fluidization stream from line 18d has the highest concentration of oxygen and fluidizes and combusts remaining coke deposits on partially regenerated catalyst entering the lower chamber 90. The regeneration gas exits the lower chamber 90 in line 92 and is distributed in the upper chamber 80 through the gas distributor 88.

The burner 20 is located outside of the regeneration vessel 85. In an embodiment, the burner 20 is located outside of the upper chamber 80 and the lower chamber 90 of the regeneration vessel 85. The fuel stream 16 undergoes combustion in the presence of the combustion stream 19 inside the burner 20 to provide a hot flue gas in a hot flue gas line 22. The hot flue gas may be at a temperature of about 900° C. (1652° F.) to about 1100° C. (2012° F.). The superficial velocity in the upper chamber 80 and the lower chamber 90 is typically between about 0.5 m/s (1.6 ft/s) and about 1.2 m/s (4.0 ft/s).

The hot flue gas 22 is passed to the plurality of catalyst heaters 30, 40 and 50. The hot flue gas 22 is divided into three parts 22a, 22b, 22c and passed to the plurality of catalyst heaters 30, 40, and 50, respectively. In an exemplary embodiment, depending on unit capacity and equipment layout, more than three or less than three catalyst heaters may be present. Each catalyst heater comprises a heating tube 32, 42, and 52, respectively. The heating tube may have a straight or serpentine configuration. In an exemplary embodiment, one or more heating tubes may be present in the catalyst heater 30, 40, and 50.

The hot flue gas from line 22 flows through the heating tube of the catalyst heater 30, 40, and 50 to heat a partially regenerated catalyst stream 84a, 84b, and 84c, respectively, and provide a heated partially regenerated catalyst stream 86a, 86b, and 86c, respectively. The catalyst heaters 30, 40, and 50 may be shell and tube type heat exchangers. The partially regenerated catalyst stream 84a, 84b, and 84c from the upper regeneration vessel flows outside the heating tube 32, 42, and 52 on the shell side of the catalyst heaters 30, 40 and 50, respectively.

Each catalyst heater 30, 40, and 50 may comprise a catalyst chamber, respectively located outside of the regenerator vessel 85, specifically located outside of the upper chamber 80 and the lower chamber 90 of the regenerator vessel 85. Each catalyst chamber 31, 41, and 51 comprises a heating tube 32, 42, and 52, respectively. Each heating tube 32, 42, 52 comprises a wall 33, 43, and 53. Accordingly, each catalyst chamber 31, 41, and 51 comprises a wall 33, 43, and 53. The regeneration vessel 85 is in communication with the catalyst chamber 31, 41, and 51. Specifically, the regeneration vessel 85 is in communication with one side of the wall 33, 43, and 53, and the fuel line 16 is in communication with another side of the wall, respectively, of the catalyst chamber to heat the catalyst stream. In an embodiment, hot flue gas flows in the heating tube 32, 42, and 52 inside the wall 33, 43, and 53 in the catalyst chamber 31, 41, and 51, respectively, and the catalyst stream flows on the outside of and contacts the wall in the catalyst chamber 31, 41, and 51, respectively. The surface of the heating tube may be deemed as the wall such that the hot flue gas flows inside the heating tube and catalyst stream flows outside and contacts the heating tube. The heating tube 32, 42, and 52 may have cylindrical or planar walls 33, 43, and 53, respectively. The heating tube 32, 42, and 52 may have a straight or serpentine configuration in the catalyst chamber 31, 41, and 51, respectively. A plurality of straight or serpentine heating tubes 32, 42, and 52 may be present in the catalyst chamber.

The heating tube 32, 42, and 52 may be in downstream communication with the fuel stream in line 16. The heating tube 32, 42, and 52 extends through a catalyst chamber 31, 41, and 51 for heating the catalyst stream. In an embodiment, the burner 20 may be in downstream communication with the fuel line 16 and the combustion stream in line 19 taken from the pre-heated and compressed oxygen stream 14, and the heating tube 32, 42, and 52 may be in downstream communication with the burner 20. In another embodiment, the burner 20 for combusting the fuel stream in line 16 and the combustion stream in line 19 taken from the pre-heated and compressed oxygen stream in line 14 to provide the hot flue gas in line 22 is located outside of and remote from the heating tube 32, 42, and 52. A plurality of heating tubes 32, 42, 52 may be in each catalyst heater 30, 40, 50, respectively.

After heat exchange, the hot flue gas will exit the catalyst heaters 30, 40, and 50 as a heater flue gas streams in heater flue gas lines 24a, 24b, and 24c, respectively. The heat exchange in the catalyst heaters 30, 40, and 50 is effectuated by heat transfer conducting across the wall of the heating tube 32, 42, and 52, respectively. The hot flue gas will exit the catalyst heaters at a temperature of about 700° C. (1292° F.) to about 800° C. (1472° F.). The heater flue gas streams in lines 24a, 24b, 24c are combined to form a combined heater flue gas stream in combined heater flue gas line 68. The combined heater flue gas stream passes through a flue gas expander 70 and then is passed to a pre-heater 75 for energy recovery and to pre-heat the oxygen containing gas 10 by indirect heat exchange. The flue gas will travel through the heating tubes 32, 42, 52 at about 31 m/s (100 ft/s) to about 92 m/s (300 ft/s).

The heated partially regenerated catalyst streams in lines 86a, 86b, 86c, respectively, are transported to the lower chamber 90 of the regeneration vessel. Remaining coke present on the heated partially regenerated catalyst streams 86a, 86b, and 86c is combusted using combustion and fluidization stream 18d to produce a hot regenerated catalyst. The combustion and fluidization stream in line 18d will have a higher oxygen concentration than the regeneration gas in line 92 which will be effective to combust remaining coke deposits on the catalyst.

The hot regenerated catalyst may be passed to the catalyst stripping vessel 95 to remove residual oxygen adsorbed onto the catalyst, and then returned to the reactor (not shown in the drawing) via a line 98 to provide the necessary catalyst and heat required for the process. The stripping gas is a dry inert gas, without any significant amount of oxygen in the gas, such as nitrogen.

The temperature of the hot regenerated catalyst may be at least 625° C. (1160° F.), and more preferably between 650° C. and 790° C. (1200 to 1450° F.), and most preferably the catalyst is heated to a temperature between 680° C. (1256° F.) and 720° C. (1328° F.).

Necessary heat can be provided by combusting the vapor byproducts such as from a dehydrogenation process or from a fuel source such as hydrogen, methane and ethane in a combustor and to then utilize the hot flue gas to heat the catalyst via indirect heat exchange. However, this approach may require excessive heat exchange area because the flue gas may carry insufficient heat from the combustion zone to the catalyst heat exchange vessel. Moreover, the lower the temperature of the flue gas, the less heat that flue gas can transfer to the catalyst requiring an increased and perhaps unwieldy volume of flue gas to provide sufficient heating.

Figure 2:
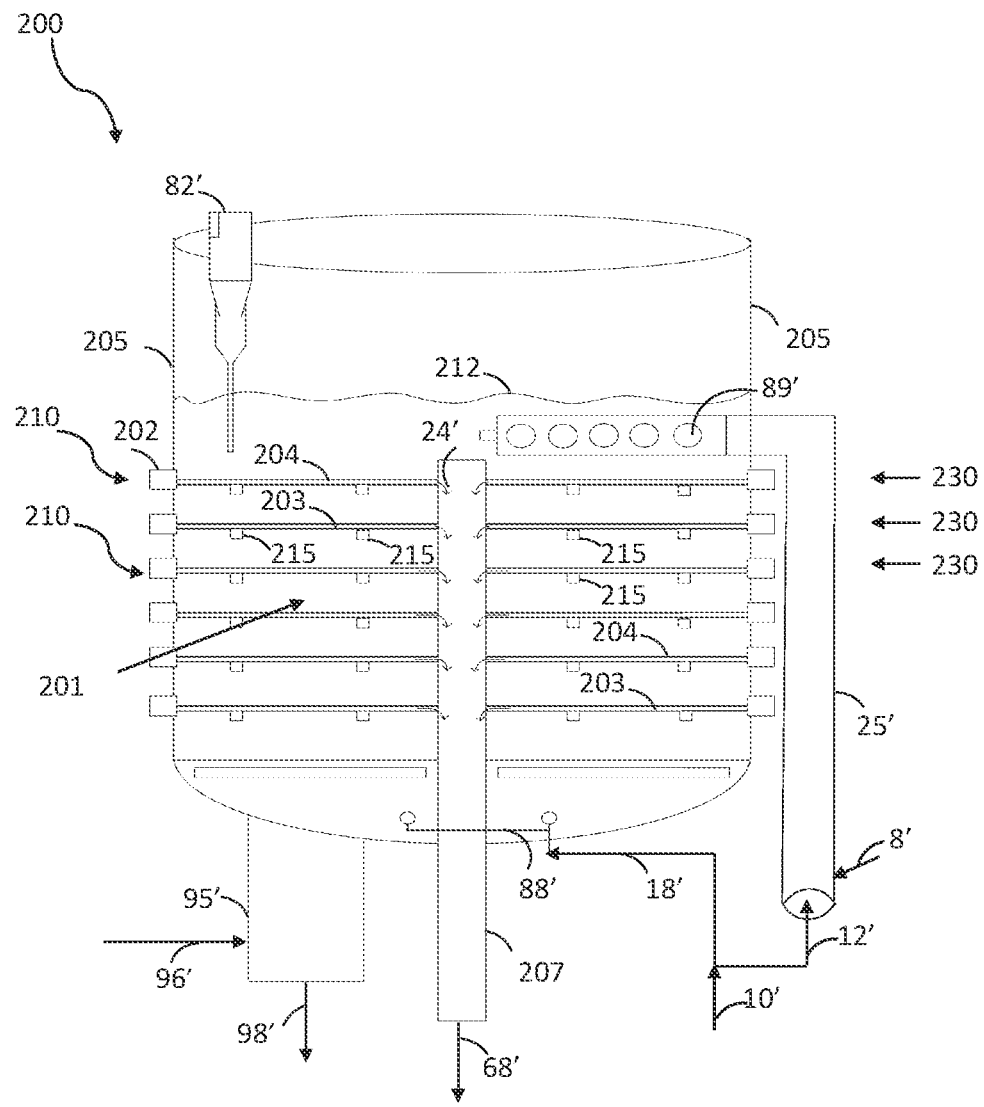
FIG. 2 is an alternative schematic representation of a regeneration vessel with a plurality of tube fired burners arranged on a wall of the regeneration vessel.

The FIG. 2 depicts an alternative regeneration vessel 200 with a catalyst chamber 201 inside of the regeneration vessel. The regeneration vessel may comprise a fluidized bed 212. The regeneration vessel 200 comprises a plurality of tube-fired burners 210 supported on a wall 205 of the regeneration vessel, a catalyst stripping vessel 95', a flue gas common header 207, a cyclone separator 82', and a riser 25'. The benefit of using a tube fired burner is that it combusts directly into the heating tube 204 which subjects the catalyst on the other side of the tube wall to heat more proximately to combustion thereby efficiently exposing the catalyst stream to more of the heat of combustion.

The regeneration vessel 200 comprises a catalyst chamber 201 located inside the regenerator vessel. The catalyst chamber 201 comprises at least one heating tube 204 that comprises a wall 203. The wall 203 may be cylindrical. Hot combustion occurs and hot flue gas flows inside the wall inside the catalyst chamber 201 and the catalyst stream flows outside of and contacts the wall 203 in the catalyst chamber. The heating tube 204 may have cylindrical or planar walls 203. The catalyst chamber 201 may comprises a plurality of heating tubes 204 each comprising respective walls 203.

Each of the tube-fired burners 210 includes a mixing chamber 202 and a heating tube 204. The mixing chamber 202 may be located on the wall 205 of the regeneration vessel 205 and the heating tube 204 may be located inside the regeneration vessel 200 in the catalyst chamber 201.

As shown in FIG. 2, a spent catalyst stream in a spent catalyst line 8' is passed to the riser 25'. An oxygen containing gas stream in a line 10' is divided into a first portion in line 12' and a second portion in line 18'. The first portion in line 12' is used as a catalyst lift gas in the riser 25'. The lifted spent catalyst stream in line 8' is lifted in the riser 25' and distributed in the regeneration vessel 200 via a catalyst distributor 89'. The second portion of the oxygen containing gas stream in line 18' is passed to the regeneration vessel 200 and distributed by distributor 88' for fluidization of the spent catalyst as well combustion of coke present on the spent catalyst.

In the regeneration vessel 200, coke present on the spent catalyst from line 8' is combusted to regenerate the catalyst and the regenerated catalyst is simultaneously heated by coming into proximity and/or contacting the plurality of heating tubes 204 to provide a hot regenerated catalyst. The hot combustion flame burning inside the heating tubes 204 provides radiant heat to the heating tubes and generates hot flue gas flowing in the tubes which convectively heats the heating tubes. Heat conducting across the heating tubes heats the catalyst stream contacting the heating tubes and flowing proximate to the heating tubes in the catalyst chamber 201.

The hot regenerated catalyst may be passed to the catalyst stripping vessel 95' to remove residual oxygen adsorbed onto or entrained with the catalyst and is then returned to the reactor (not shown) via a line 98' to provide the necessary heat required for the reaction process. The stripping gas may be a dry inert gas, such as nitrogen, without any significant amount of oxygen in the gas.

Figure 3:
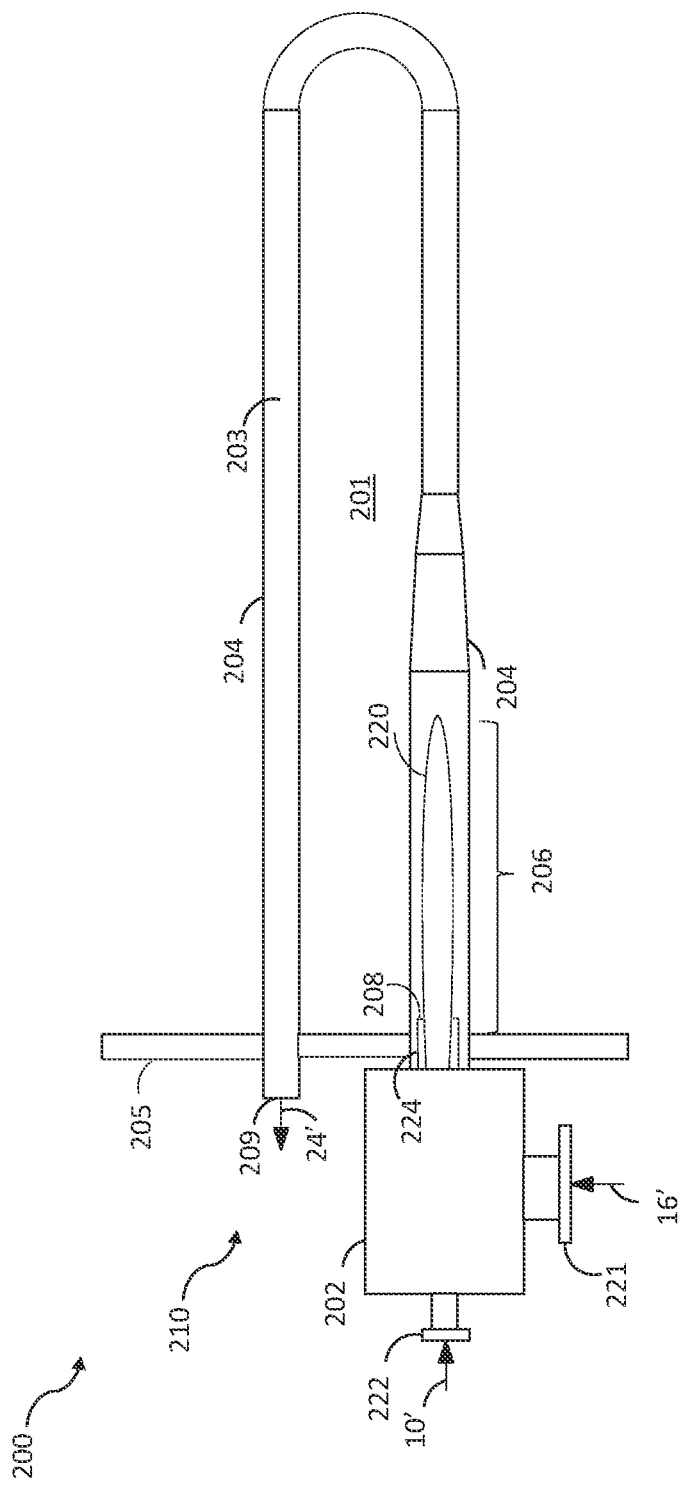
FIG. 3 is a schematic representation of a tube fired burner of FIG. 2.

FIG. 3 depicts a detailed arrangement of a tube fired burner 210 including a mixing chamber 202 and a heating tube 204. The heating tube has an inlet 208 and an outlet 209. As shown in FIG. 3, a fuel stream in a fuel line 16' and an oxygen containing gas stream in an oxygen containing gas line 10' is passed to the mixing chamber 202 to provide a mixed stream. The mixing chamber is in downstream communication with the fuel line 16' and the oxygen containing gas line 10'. The fuel stream in line 16' and the oxygen containing gas stream in line 10' are mixed outside of said regeneration vessel 200 in the mixing chamber 202 proximate to the regeneration vessel.

In an embodiment, the catalyst chamber 201 comprises the wall 203. The regeneration vessel 200 may be in communication with one side of the wall 203 and the fuel line 16' may be in communication with another side of the wall of the catalyst chamber to heat the catalyst stream. In an embodiment, the regeneration vessel 200 may be in communication with an outside of the wall 203 of the heating tube 204 and the fuel line 16' may be in communication with an inside of the wall of the heating tube in the catalyst chamber 201 to heat the catalyst stream. The fuel line 16' is in upstream communication with the heating tube 204 extending through the catalyst chamber 201 inside the regeneration vessel 200. In another embodiment, the fuel line 16' is in upstream communication with the mixing chamber 202 which is in further upstream communication with the heating tube 204. The mixing chamber 202 has a mixing chamber inlet 221, 222 outside of the regeneration vessel 200 and a mixing chamber outlet 208 to the heating tube 204 inside the regeneration vessel. The mixing chamber outlet 208 may serve as the inlet to heating tube. A nozzle 224 of the mixing chamber 202 may extend into the regeneration vessel 200 through the wall 205 and into the heating tube 204 and provide the mixing chamber outlet/heating tube inlet 208. In another embodiment, the mixing chamber 202 has the mixing chamber inlet 221, 222 outside of the catalyst chamber 201 and the mixing chamber outlet/heating tube inlet 208 inside the catalyst chamber. In another embodiment, the inlet 208 to the heating tube may be outside of the regeneration vessel 200 or the catalyst chamber 201. In this embodiment, the mixing chamber 202 and the inlet 208 to the heating tube 204 should be adjacent and proximate to the regeneration vessel 200 and the catalyst chamber 201. Moreover, the mixing chamber may be located on the wall 205 of the regeneration vessel 200. In an exemplary embodiment, certain internals such as baffles and orifices on the nozzle 224 are used in conjunction with turbulent flow in the tube fired burners 210 to promote a swirling effect in the heating tube 204 for enhanced heat transfer.

Tube fired burners 210 avoid the need for a hot transfer line for conveying hot flue gas from the burner to the heating tubes 204. Fabrication of hot flue gas transfer lines suitable for flame temperatures is challenging and difficult to seal at junctions. In addition, heat loss from the hot transfer line to atmosphere leads to inefficiency. Remote, exterior burners are generally operated with increased excess air to reduce the temperature of the hot flue gas down to a level temperature allowing selection of suitable materials for fabrication of the hot transfer lines. Remote, exterior burners generally use about 150% excess air to control the transfer line temperature to 1000° C. The applicants have found that tube fired burners 210 can be used without hot transfer lines and therefore allow flue gas temperatures to approach the adiabatic flame temperature with stoichiometric air. Tube fired burners 210 generally require only 5-30% excess air for stable operation since the tubes are immersed in the catalyst stream being heated.

The mixed stream is injected into the heating tube 204 through the inlet 208 and ignited to generate a hot combustion flame 220 by combustion of the mixture inside a combustion section 206 of the heating tube 204 at a temperature of about 1800° C. (3272° F.) to about 2300° C. (4172° F.). The fuel stream 16' and the oxygen containing gas stream 10' are combusted in the combustion section 206 of the heating tube 204 which is contacted by the catalyst stream. The combustion section 206 of the heating tube 204 is inside the regenerator vessel 200. The combustion of the gases generates hot flue gas. The hot combustion flame and hot flue gas travel at high velocity and heats the heating tube 204 through the outlet 209. After heat exchange with the catalyst stream flowing by and contacting the wall 203 of the heating tube 204, the hot flue gas from the plurality of burners 210 exits the heating tube 204 through the outlet 209 as a burner flue gas in a line 24' at a temperature of about 900° C. (1652° F.) to about 1100° C. (2012° F.).

Applicants have also found that using a tube fired burner results in greater heat transfer capability than mere convective heating in catalyst heaters. Turning hack to FIG. 2, the superficial velocity of the hot flue gas is high and typically between about 300 ft/s and about 500 ft/s. In an exemplary embodiment, diameter of the heating tubes 204 vary between 2 to 12 inches. The tube fired burner 210 generates a high velocity flame at a very high temperature which results in good heat transfer. Combustion in the heating tubes 204 generates sufficient heat to cause the heating tubes to radiate heat to the surrounding catalyst stream. Moreover, heating tubes 204 of tube fired burner 210 are embedded in the fluidized catalyst bed 212 in the regeneration vessel 200. The fluidized bed 212 exhibits very high heat transfer capability and thus can accommodate the high temperature flame generated inside the heating tubes 204 thereby reducing the risk of generating hot zones in the catalyst bed.

In an exemplary embodiment, layers 230a, 230b, 230c of tube fired burners 210 may be stacked vertically in the regeneration vessel 200 to provide multiple layers of burners. A plurality of mixing chambers 202 of tube fired burners 210 may be arranged radially around the wall 205 of the regeneration vessel 200 in each layer 230. In an exemplary embodiment, about 3 to 5 layers 230 of burners may be arranged vertically around the regenerator.

Figure 4:
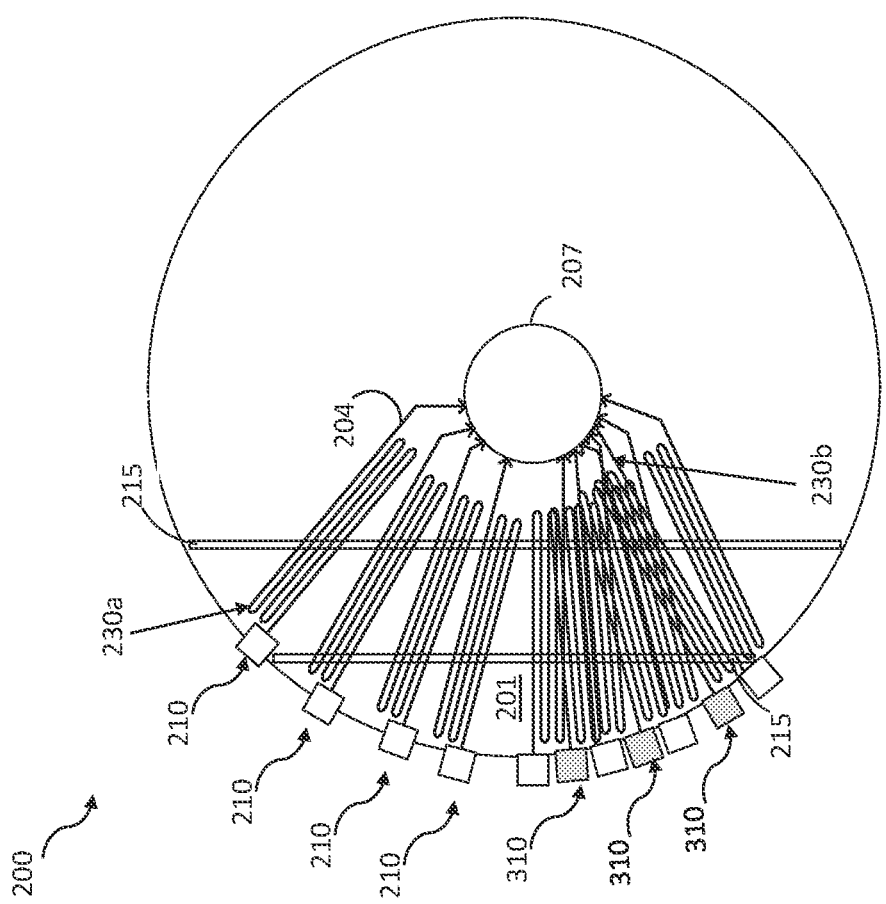
FIG. 4 is a schematic representation of top view of the regeneration vessel of FIG. 2.

FIG. 4 depicts a top view of the regeneration vessel 200 of FIG. 2 partially showing two layers 230 of burners. A first layer 230a having plurality of burners 210 and a second layer 230b having a plurality of burners 310. The heating tube 204 may have a serpentine configuration in the catalyst chamber 201. Heating tubes may be supported using support beams 215. A plurality of layers 230 of serpentine heating tubes 204 may be present in the catalyst chamber 201. Depending on the unit capacity and equipment layout, a plurality of about 17 to about 21 tube fired burners may be arranged radial along the periphery of the regeneration vessel in each layer 230.

Figure 5:
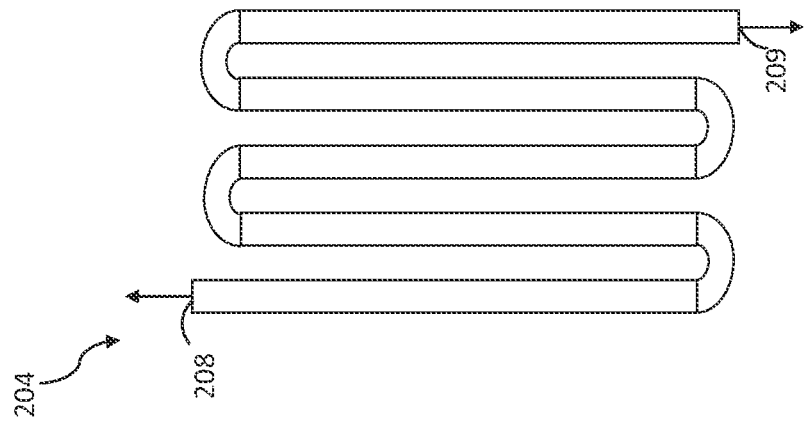
FIG. 5 is a schematic representation of 5-pass heating tube used in the tube fired burner of FIG. 2.

The heating tube 204 may comprises a 5-pass bundle as shown in FIG. 5 with the inlet 208 and the outlet 209. In an exemplary embodiment, the heating tube 204 may comprises a 7-pass bundle. Other numbers of passes may be suitable.

EXAMPLE

Applicants have compared Scenario 1 of a catalyst stream heated using a hot flue gas generated in a burner located upstream of heating tube in a catalyst chamber and Scenario 2 of a catalyst stream heated using a hot flame and hot flue gas generated inside the heating tube located in a catalyst chamber of a regenerator vessel. The flue gas generated in Scenario 1 is at lower temperature than the flue gas of Scenario 2.

| | Flue Gas Temperature (° C.) | Temperature to which catalyst needs to be heated (° C.) | ΔT (° C.) |
| --- | --- | --- | --- |
| Scenario 1 | 1000 | 700 | 300 |
| Scenario 2 | 2200 | 700 | 1500 |

Due to the high temperature flame in Scenario 2, overall ΔT for flue gas is much larger for radiant heating of the tubes compared to mere convective heating of the tubes of Scenario 1. ΔT is the temperature difference between the gas entering the heating tube and temperature to which catalyst needs to be heated before circulating to a reactor. Therefore, tube-fired burners used in Scenario 2 have a high heat transfer capability than convective heat transfer utilized in Scenario 1.

While the subject matter has been described with what are presently considered the preferred embodiments, it is to be understood that the subject matter is not limited to the disclosed embodiments, but it is intended to cover various modifications and equivalent arrangements included within the scope of the appended claims.

SPECIFIC EMBODIMENTS

While the following is described in conjunction with specific embodiments, it will be understood that this description is intended to illustrate and not limit the scope of the preceding description and the appended claims.

A first embodiment of the invention is a process for heating a catalyst in a regeneration zone comprising a regeneration vessel and a plurality of heating tubes, the process comprises passing a catalyst stream from a reactor vessel to a regeneration vessel; passing a hot flue gas inside a heating tube; contacting the heating tube with the catalyst stream to heat the catalyst stream and produce a hot regenerated catalyst stream; and passing the hot regenerated catalyst stream to the reactor vessel. An embodiment of the invention is one, any or all of prior embodiments in this paragraph up through the first embodiment in this paragraph further comprising combusting a fuel stream and an oxygen containing gas stream to provide the hot flue gas. An embodiment of the invention is one, any or all of prior embodiments in this paragraph up through the first embodiment in this paragraph further comprising combusting the fuel stream and the oxygen containing gas stream in a section of the heating tube contacted by the catalyst stream. An embodiment of the invention is one, any or all of prior embodiments in this paragraph up through the first embodiment in this paragraph further comprising combusting the fuel stream and the oxygen containing gas stream inside the section of the heating tube that is inside the regenerator vessel. An embodiment of the invention is one, any or all of prior embodiments in this paragraph up through the first embodiment in this paragraph further comprising mixing the fuel stream and the oxygen containing gas stream outside of the regeneration vessel. An embodiment of the invention is one, any or all of prior embodiments in this paragraph up through the first embodiment in this paragraph further comprising heating the catalyst stream with radiant heat. An embodiment of the invention is one, any or all of prior embodiments in this paragraph up through the first embodiment in this paragraph wherein the regeneration vessel is a fluidized bed. An embodiment of the invention is one, any or all of prior embodiments in this paragraph up through the first embodiment in this paragraph further comprising passing the hot regenerated catalyst stream through a stripping section before passing the hot regenerated catalyst stream to the reactor vessel. An embodiment of the invention is one, any or all of prior embodiments in this paragraph up through the first embodiment in this paragraph further comprising combusting a fuel stream and an oxygen containing gas stream outside of the heating tube.

A second embodiment of the invention is a reactor apparatus comprising a reactor vessel comprising a reactor catalyst inlet and a reactor catalyst outlet, a regeneration vessel in communication with the reactor catalyst outlet comprising a regenerator catalyst inlet and a regenerator catalyst outlet; a heating tube in downstream communication with a source of fuel and the heating tube extending through a catalyst chamber for heating a catalyst stream, wherein the regeneration vessel is in fluid communication with the catalyst chamber. An embodiment of the invention is one, any or all of prior embodiments in this paragraph up through the first embodiment in this paragraph wherein the catalyst chamber is in the regeneration vessel. An embodiment of the invention is one, any or all of prior embodiments in this paragraph up through the first embodiment in this paragraph further comprising a mixing chamber with a mixing chamber inlet outside of the catalyst chamber and a mixing chamber outlet to the heating tube inside the catalyst chamber. An embodiment of the invention is one, any or all of prior embodiments in this paragraph up through the first embodiment in this paragraph further comprising a fuel line and an oxygen containing gas line in communication with the mixing chamber. An embodiment of the invention is one, any or all of prior embodiments in this paragraph up through the first embodiment in this paragraph further comprising the mixing chamber on the wall of the regeneration vessel. An embodiment of the invention is one, any or all of prior embodiments in this paragraph up through the first embodiment in this paragraph wherein the heating tube has a serpentine configuration in the catalyst chamber. An embodiment of the invention is one, any or all of prior embodiments in this paragraph up through the first embodiment in this paragraph further comprising a plurality of layers of serpentine heating tubes in the catalyst chamber. An embodiment of the invention is one, any or all of prior embodiments in this paragraph up through the first embodiment in this paragraph further comprising the catalyst chamber is in a shell and tube heat exchanger. An embodiment of the invention is one, any or all of prior embodiments in this paragraph up through the first embodiment in this paragraph further comprising a burner in downstream communication with a fuel line and an oxygen containing gas line and the heating tube is in downstream communication with the burner.

A third embodiment of the invention is a reactor apparatus comprising a reactor vessel comprising a reactor catalyst inlet and a reactor catalyst outlet; a regeneration vessel in communication with the reactor catalyst outlet comprising a regeneration catalyst inlet and a regeneration catalyst outlet; a heating tube in the regeneration vessel; a mixing chamber with an inlet outside of the regeneration vessel and an outlet to the heating tube inside the regeneration vessel; and the mixing chamber inlet in downstream communication with a fuel line. An embodiment of the invention is one, any or all of prior embodiments in this paragraph up through the first embodiment in this paragraph further comprising a plurality of mixing chambers arranged radially around the wall of the regeneration vessel.

A fourth embodiment of the invention is a reactor apparatus comprising a reactor vessel comprising a reactor catalyst inlet and a reactor catalyst outlet; a regeneration vessel in communication with the reactor catalyst outlet comprising a regenerator catalyst inlet and a regenerator catalyst outlet; a catalyst chamber comprising a wall wherein the regeneration vessel is in communication with a side of the wall in the catalyst chamber; and a fuel line in communication with another side of the wall of the catalyst chamber to heat a catalyst stream. An embodiment of the invention is one, any or all of prior embodiments in this paragraph up through the first embodiment in this paragraph wherein a fuel source is combusted inside the catalyst chamber. An embodiment of the invention is one, any or all of prior embodiments in this paragraph up through the first embodiment in this paragraph wherein the catalyst chamber is present inside the regeneration vessel or outside the regeneration vessel.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for heating a catalyst in a regeneration zone comprising a regeneration vessel and a plurality of heating tubes, the process comprises:
    passing a catalyst stream from a reactor vessel to a regeneration vessel;
    passing a hot flue gas inside a heating tube;
    contacting the heating tube with the catalyst stream to heat the catalyst stream and produce a hot regenerated catalyst stream; and
    passing the hot regenerated catalyst stream to the reactor vessel.

2. The process of claim 1 further comprising combusting a fuel stream and an oxygen containing gas stream to provide said hot flue gas.

3. The process of claim 2 further comprising combusting said fuel stream and said oxygen containing gas stream in a section of the heating tube contacted by the catalyst stream.

4. The process of claim 3 further comprising combusting said fuel stream and said oxygen containing gas stream inside said section of the heating tube that is inside the regenerator vessel.

5. The process of claim 3 further comprising mixing said fuel stream and said oxygen containing gas stream outside of said regeneration vessel.

6. The process of claim 1 further comprising heating said catalyst stream with radiant heat.

7. The process of claim 1 wherein the regeneration vessel is a fluidized bed.

8. The process of claim 1 further comprising passing the hot regenerated catalyst stream through a stripping section before passing the hot regenerated catalyst stream to the reactor vessel.

9. The process of claim 2 further comprising combusting a fuel stream and an oxygen containing gas stream outside of the heating tube.

* * * * *